United States Patent [19]

Redmond

[11] Patent Number: 4,938,242

[45] Date of Patent: Jul. 3, 1990

[54] CHEMICAL APPLICATOR RINSING APPARATUS

[76] Inventor: John E. Redmond, 17 W. Peru, Princeton, Ill. 61356

[21] Appl. No.: 393,960

[22] Filed: Aug. 15, 1989

[51] Int. Cl.$^5$ ............................ B08B 3/02; B08B 9/08
[52] U.S. Cl. ................................ 134/169 R; 134/170; 239/104
[58] Field of Search ........... 134/166 R, 167 R, 168 R, 134/169 R, 170; 239/104

[56] References Cited

U.S. PATENT DOCUMENTS

| | | | |
|---|---|---|---|
| 3,148,642 | 9/1964 | Gould | 222/148 X |
| 3,188,238 | 6/1965 | Lyon | 134/167 R X |
| 3,621,893 | 11/1971 | Nishimura | 134/166 R X |
| 4,106,950 | 8/1978 | Grismer | 134/22.19 X |
| 4,136,678 | 1/1979 | Beach | 222/94 X |
| 4,469,143 | 9/1984 | Vazin | 134/166 R X |
| 4,622,077 | 11/1986 | Izumi | 239/338 X |

Primary Examiner—Philip R. Coe
Attorney, Agent, or Firm—James M. Peppers

[57] ABSTRACT

A spray rinsing apparatus carried by a mobile chemical spray apparatus which includes a pair of flexible rinse water storage vessels shaped and adapted to be supported in draped position from the top of a chemical reservoir tank and the sides of the tank. A gasoline engine driven pump is connected to withdraw rinse water from the flexible vessels. The rinse water is pumped at high pressure into a built-in spray head assembly inside the chemical tank and also through a jet spray gun to clean the exterior of the chemical spray apparatus. The system is capable of confining the chemical spray chemicals to the application job site and thus avoid contamination anywhere else.

15 Claims, 3 Drawing Sheets

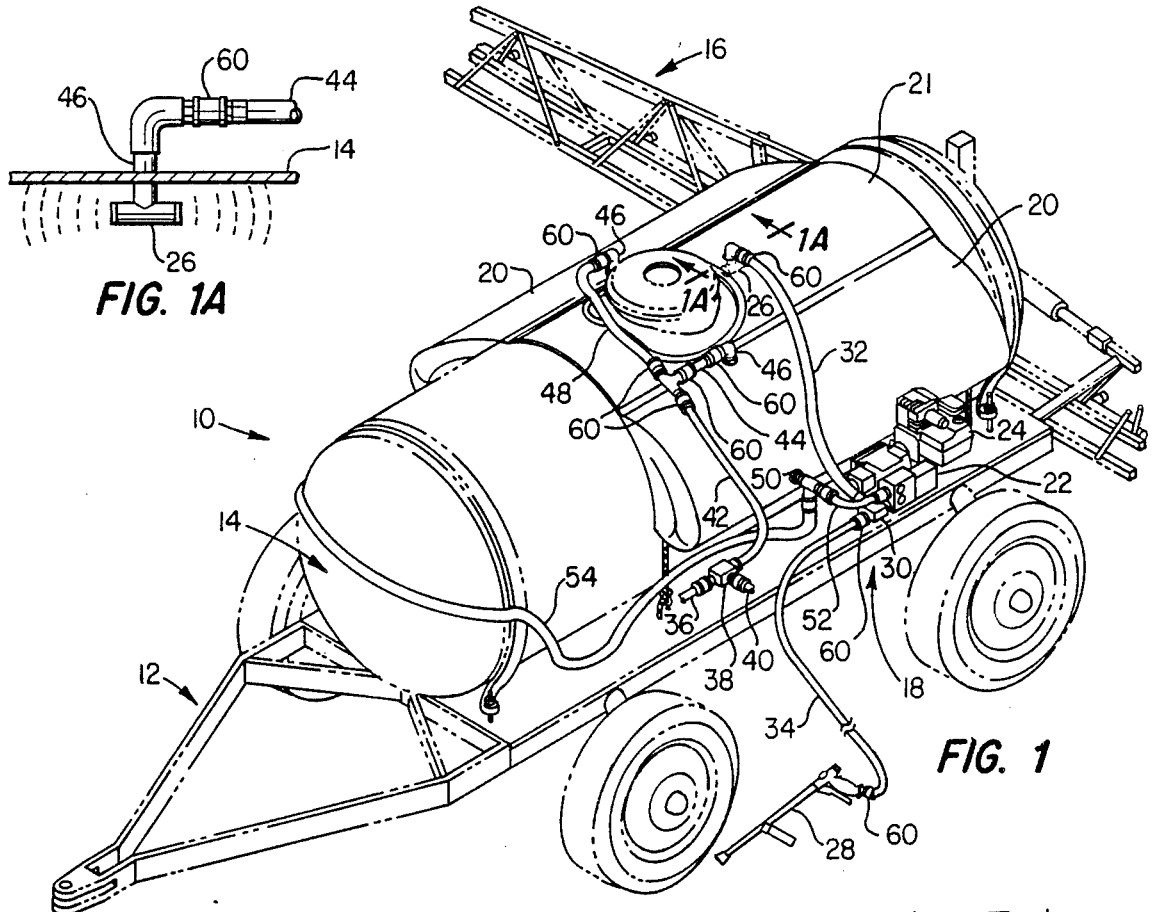
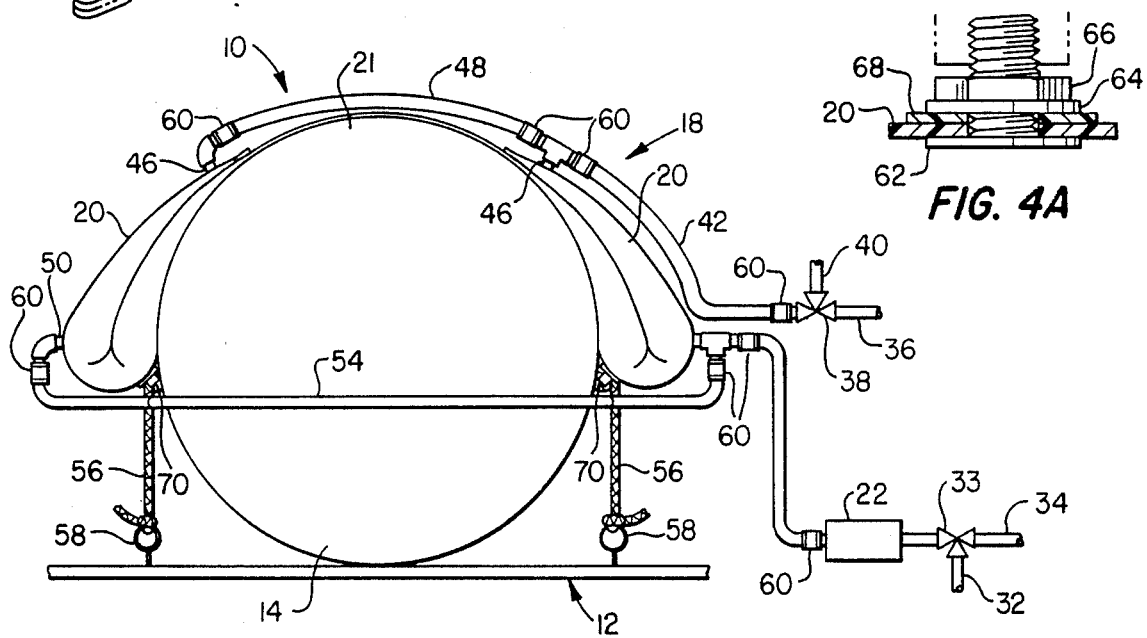

CHEMICAL APPLICATOR RINSING APPARATUS

FIELD OF THE INVENTION

This invention generally relates to mobile chemical spray apparatus for applying liquid chemical fertilizers and pesticides to agricultural crops and land. More particularly, the invention pertains to self-contained and mobile rinsing apparatus carried by the spray apparatus and adapted to rinse clean the spray apparatus internally and externally at the site where the liquid chemicals have been applied.

BACKGROUND OF THE INVENTION

The chemical spray apparatus in present use is usually returned to a central shop after use where it may be spray cleaned with a standard garden hose. When the spray apparatus and chemical tank is rinsed internally and externally in this manner, concentrated chemicals may be splashed onto the skin and clothing of personnel, and the ground. The central shop area is susceptible to becoming contaminated with resulting violation of government regulations concerning contamination of the environment. There is also possible danger to an operator along with corrosion of the spray apparatus and shop equipment. Sometimes the spray application apparatus is rinsed near a water well where the crops have been sprayed. If a spill occurs near the well during rinsing, direct contamination of the fresh water source can result.

When switching from one chemical to a second chemical, another procedure is to rinse the chemical tank, then spread the residual rinse water back on the same field. Cleaning in this manner can take as many as three rinsings and require extensive time to complete.

The exterior of the spray applicator apparatus, laden with dirt, dust and chemicals, can become a problem. Some of this residue can fall off and be a source of contamination. Back at the central shop, the exterior is often washed down in the same place, allowing the residue to go down in the same ditch or drain. This contaminated water can eventually find its way to a fresh water source. If the apparatus is not washed, rain will eventually accomplish the same result.

The spray rinsing apparatus of the present invention is carried by the chemical spray applicator apparatus where it can be used at the spray application site to rinse clean the spray applicator apparatus including its chemical storage tank. At the site, after use, the spray rinsing water simply contains more of the same chemical which has been applied at the same site.

The presently known prior art includes U.S. Pat. Nos. 3,148,642; 3,188,238; 3,621,893; 4,106,950; 4,136,678; 4,469,143; and 4,622,077.

OBJECTS OF THE INVENTION

An important object of the present invention is to provide safety for an operator while the chemical tank is automatically cleaned internally without danger to the operator;

Another object is to permit the operator to stand a safe distance away while cleaning the exterior of a spray applicator with a high pressure spray gun;

Another object of the present invention is to provide cleaning of the spraying equipment in the field with no contaminating chemicals being deposited near water wells or back at a central shop;

Another object of the present invention is to save money and man hours by providing speed and ease of operation where cleaning is done in the same place that chemicals have been applied while cleaning is done in a much better manner than by conventional means;

Yet another object of the present invention is to keep the chemical spray apparatus clean of harmful corrosion resulting from some of the chemical fertilizers and pesticides.

SUMMARY OF THE INVENTION

The foregoing and other objects and advantages of the invention are attained with spray rinsing apparatus adapted for connection with a mobile chemical spray apparatus which includes a vehicle, an enclosed and elongated chemical tank, and a chemical applicator spray array. The rinsing apparatus includes at least one flexible rinse water storage vessel made of a flexible, coated, watertight fabric shaped and adapted to be supported in a draped position from the top of the chemical tank, across an upper side of the tank and along a side of the tank. A first fluid passageway is formed near the top of the vessel. A second fluid passageway is formed near the bottom of the vessel for releasing a liquid through an outlet conduit. A pump is mounted on the vehicle with a pump inlet connected to the outlet conduit and a pump outlet connected to the inlet of a switching valve. A spray head assembly is mounted into the top of the chemical tank for spray rinsing the complete interior of the chemical tank with rinsing water applied at high pressure. The spray head is connected through a spray head conduit into a first outlet of the switching valve. A manually held and operated spray gun having a manually variable spray pattern adjustment is connected through a spray gun conduit into a second outlet of the switching valve. A pair of the flexible rinse water storage vessels may be used which are connected together through a liquid equalizer conduit connected into the outlet of each of these vessels. The flexible coated fabric may be a flexible polymer such as a plastic material or a rubber material. The fluid passageways are formed through the wall of the flexible storage vessel with reinforcing material and a compression type fitting. The pump is a positive displacement pump driven by an internal combustion engine such as a gasoline engine. A plurality of quick-disconnect conduit connectors are provided to connect all the conduits respectively with the flexible storage vessels, the water source, the pump, the switching valves, the spray gun, and the rinsing spray head.

BRIEF DESCRIPTION OF THE DRAWING

FIG. 1 is a schematic isometric view of the rinsing apparatus mounted on a chemical spray applicator trailer shown in ghosted lines;

FIG. 1A is a schematic sectional view showing the rinsing heads installed in the chemical tank of FIG. 1;

FIG. 3 is an end elevational view of the apparatus as shown in FIG. 1;

FIG. 4A is a sectional detail view of construction of the fluid passageways as taken at lines 4A—4A of FIG. 4;

DESCRIPTION OF A PREFERRED EMBODIMENT

Figure 2:
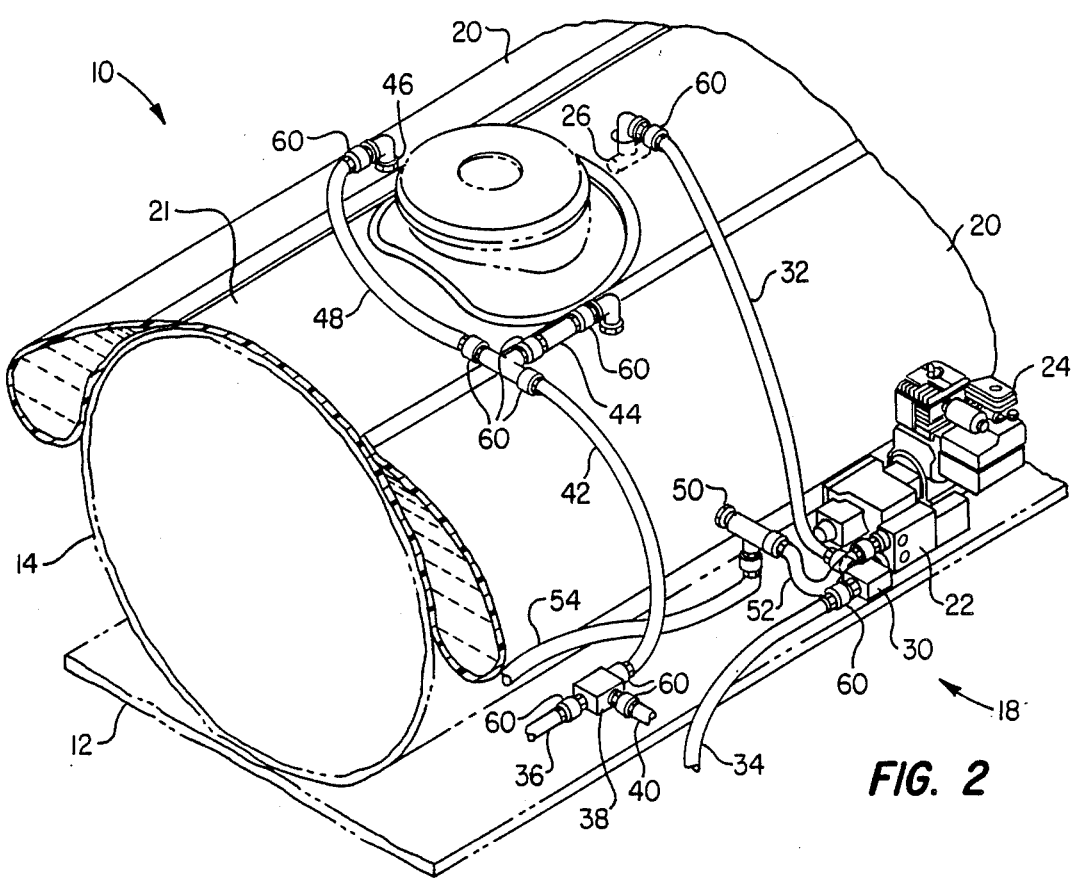
FIG. 2 is another schematic isometric view similar to FIG. 1 but showing the chemical tank and the rinsing water storage vessels in cross-section.

FIG. 1 illustrates a chemical spray applicator 10 which includes a trailer unit 12, an elongated and enclosed chemical tank 14 carried by the trailer unit, and a chemical spray application array structure 16 carried by the trailer unit 12 and transversely disposed across the path of the trailer unit.

A chemical rinsing apparatus 18 includes a pair of "saddle bag" reservoir vessels 20 connected together by a connection sheet 21 and draped across the top, the upper sides, and the sides of the chemical tank 14. Each of the storage vessels 20 is made of a generally rectangular flexible, coated, watertight fabric shaped and adapted as shown to be supported in a draped position from the top, across an upper side, and along each side of the chemical tank 12. The flexible vessels 20 may be regarded as watertight pouches or bags.

The rinsing apparatus 18 includes a high pressure pump 22 having a power source such as a gasoline engine 24. The high pressure discharge side of the pump 22 is connected into a high pressure switch valve 30.

The valve 30, in turn, is connected through a conduit 32 into a spray head or heads 26 permanently installed inside the tank 14. The heads 26 are arranged and oriented to spray the entire inner walls of the chemical tank 14 with a high pressure and forceful spray of rinse water.

The high pressure switch valve 30 is also connected through a high pressure conduit or hose 34 into a manually adjustable high pressure jet/spray gun 28 which is normally hand-carried and used by an operator. Spray gun 28 is a conventional device.

Each of the flexible reservoir vessels 20 is provided with an outlet passageway 50. The inlet of pump 22 is connected through a low pressure conduit 52 into one of the outlet passageways 50 and also through a conduit or hose 54 which is passed around the tank 14 as shown to connect into the other outlet passageway 50 (not shown).

Rinse water is introduced into vessels 20 of the rinsing apparatus 18 through an inlet hose or conduit 36 into an inlet switch valve 38. The switch valve 38 has a service connection 40 and also an inlet hose or conduit 42 that goes to the reservoir vessels 20. The hose 42 is connected into a hose 44 which goes into a tank inlet passageway 46. The hose 42 also connects into a hose 48 which goes into the inlet passageway 46 of the other tank 20 as shown in FIG. 1.

As shown in FIG. 3, the flexible vessels 20 are respectively tied down to the trailer unit 12 and about the chemical tank 14 by means of cables 56 pulled into connection with tie-down rings 58.

As seen in FIGS. 1, 2 and 3, all of the hoses or conduits are connected through "quick-disconnect" hose connectors 60 which are conventional and commonly available. These quick-disconnect hose connectors 60 enable the spray apparatus 18 to be readily connected and disconnected.

Figure 4:
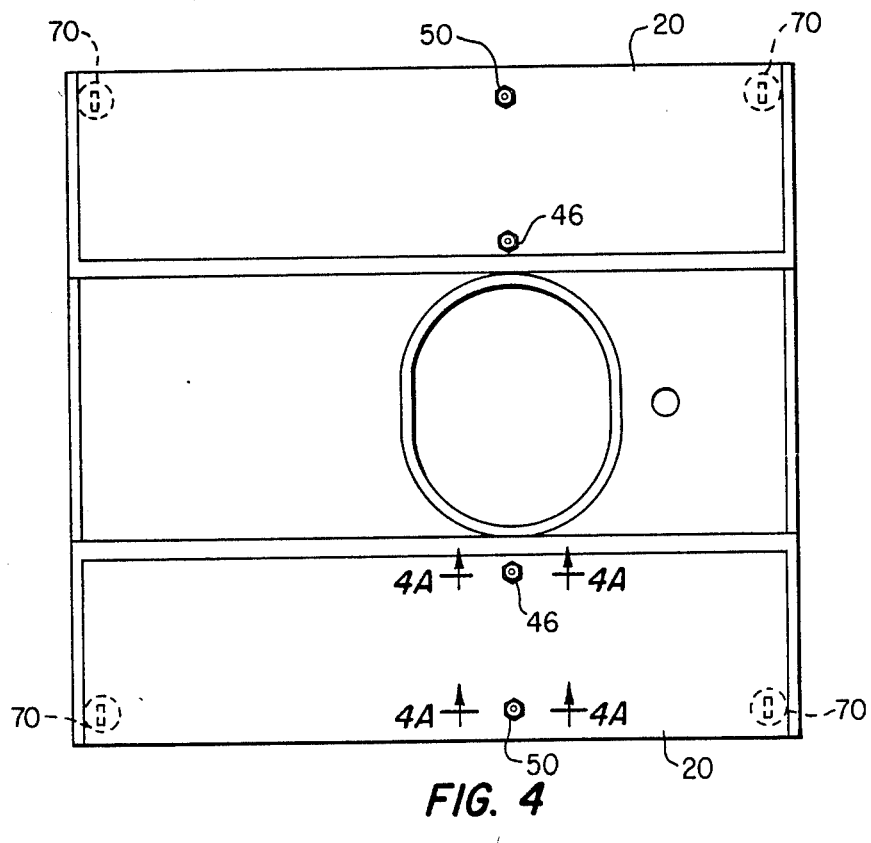
FIG. 4 is a plan view of the flexible water reservoir vessels as shown in FIGS. 1, 2, and 3.

FIG. 4 shows the mounting of the tie eyelets 70 as being underneath the flexible vessels 20 in order to better connect the cables 56 into rings 58 as previously described with respect to FIG. 3.

Figure 5:
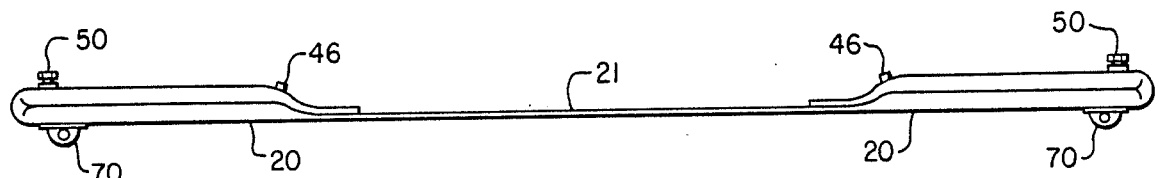
FIG. 5 is an end elevational view of the reservoir vessels shown in FIG. 4.

The structure of the flexible bags 20 and inter-connecting fabric sheet 21 is further shown in FIG. 5.

FIG. 4A shows a detailed view of the structure of a typical flow passageway 46 or flow passageway 50. As shown, a flanged bushing 62 is passed through a hole from the inside of a reservoir vessel 20 through the wall of the vessel and through an extra layer of a reinforcing material 68. On the outside of the vessel 20, a washer 54 is placed down on the bushing 62 followed by a threaded nut 66 which clamps the assembly tightly together for a waterproof connection. Appropriate threaded fittings (not shown) are used in connection with each connector 60 to connect the various hoses or conduits into connection as shown and described with reference to the drawings.

Figure 6:
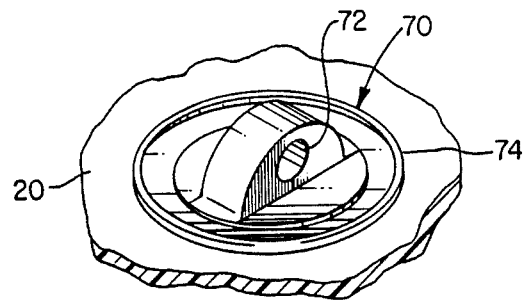
FIG. 6 is an isometric view of a tie-down eyelet as shown on the reservoir vessels.

A detailed illustration of the tie eyelet 70 is shown in isometric in FIG. 6. As shown, the eyelet 70 includes a hole 72 to receive a cable such as 56. The eyelet 70 has a flanged bottom and an eyelet pad 74 fused to the vinyl sheet 20, if vinyl, or vulcanized to the rubber sheet 20, if rubber.

Figure 6A:
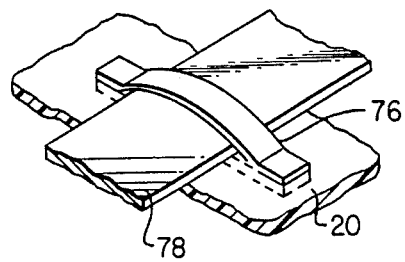
FIG. 6A is an isometric view showing a strap and strap loop arrangement as an alternate to the eyelet of FIG. 6.

An alternate to the eyelet 70 shown in FIG. 6 is a strap loop 76 and strap 78 arrangement as shown in FIG. 6A. This alternate arrangement is not used in the present embodiment but is shown as a matter of information.

Figure 7:
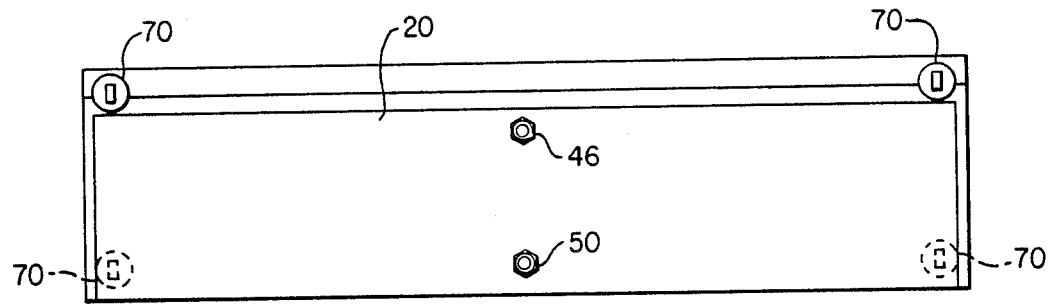
FIG. 7 is a plan view of a single flexible water reservoir vessel as an alternate to the pair of vessels shown in FIGS. 1, 2, 3, 4 and 5.
Figure 8:
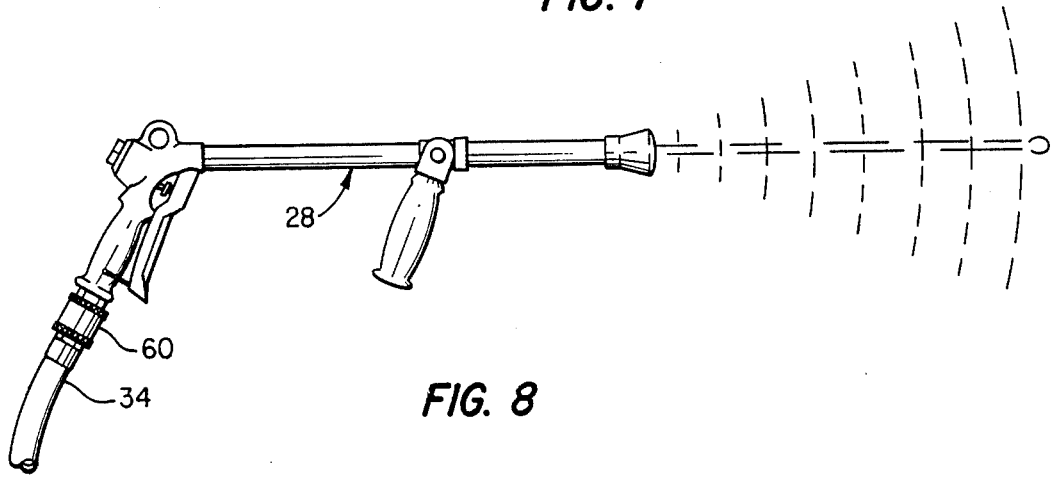
FIG. 8 is a side view of a commercially available high pressure water jet gun as used with the invention.

FIG. 7 illustrates a single flexible reservoir 20 which may be used alone or as a pair to replace the connected pair of reservoirs as shown in FIG. 5. If the embodiment of FIG. 7 is used as the only reservoir, then the cables 56 as shown in FIG. 3 are passed over the top of the tank to support the single reservoir 20 in the same draped position across the top and along the side of chemical tank 14. Providing individual tanks 20 instead of (or in addition to) the combined tank shown in FIG. 5 may sometimes be beneficial.

Each of the flexible vessels 20 may hold approximately 100 gallons of rinse water. Accordingly, if a pair of bags 20 as shown in FIG. 1 are utilized, then 200 gallons of rinse water will be available. If only one reservoir vessel 20 as shown in FIG. 7 is used, then 100 gallons will be available.

In a typical application, the pump 22 will pump 10 gallons per minute at a pressure of 500 psi. Thus a combined rinsing time of 10 minutes will be available with the use of one reservoir vessel 20 and 20 minutes with the use of two reservoir vessels 20.

In operation, the interior of the chemical tank 14 may first be spray rinsed with the rinse water draining out of the chemical spray applicator unit 16. After the interior of the chemical tank 14 has been thoroughly rinsed, then the remaining water can be used through the spray gun 28 to jet down the exterior of the chemical spray applicator including the trailer unit 12, the chemical tank 14, and the chemical spray structure 16.

It is to be noted that the rinse water tanks may be refilled at any convenient site, for example, out in the field, at some nearby water source on the way to the field, or at a local water well.

It is also noted that all the dilute chemicals washed out of the chemical tank 14 and the spray structure 16 can be left in the field where the bulk of the chemical has been sprayed on as fertilizer and/or pesticide.

It is to be further noted that while only one embodiment of the invention has been specifically disclosed herein, various modifications and revisions can be made, all within the scope and purview of the appended claims.

What is claimed:

1. Spray rinsing apparatus connected with a mobile chemical spray apparatus including a vehicle, an elongated, enclosed chemical tank, and a chemical spray array, comprising in combination:
    (a) a pair of generally rectangular and flexible rinse water storage vessels each made of a flexible, coated, watertight fabric and adapted to be supported in draped position across the upper sides and along each side of said chemical tank;
    (b) first fluid passageways formed near the tops of said flexible vessels;
    (c) second fluid passageways formed near the bottoms of said vessels for releasing liquid through outlet conduits;
    (d) a pump means mounted on said vehicle with a pump inlet connected to said outlet conduits and a pump outlet connected to the inlet of a high pressure switching valve means;
    (e) spray head means mounted into the top of said reservoir tank for spray rinsing the interior of said reservoir tank;
    (f) said spray head means being connected through a spray head conduit into a first outlet of said high pressure switching valve means;
    (g) a manually held and operated high pressure spray gun means having a manually variable spray pattern adjustment and connected through a spray gun conduit into a second outlet of said high pressure switching valve means; and
    (h) said flexible storage vessels being connected together through a liquid equalizer conduit connected into the outlet passageway of each said storage vessel.

2. The apparatus of claim 1 wherein each said flexible storage vessel is formed of a woven fabric.

3. The apparatus of claim 2 where the coating of said woven fabric is a flexible polymer.

4. The rinsing apparatus of claim 3 wherein said flexible polymer is a plastic material.

5. The rinsing apparatus of claim 3 wherein said flexible polymer is a rubber material.

6. The apparatus of claim 1 wherein said first and said second fluid passageways are formed respectively through a wall of said flexible storage vessels with reinforced compression type fitting means.

7. The apparatus of claim 6 wherein said pump means is a positive displacement pump driven by an internal combustion engine.

8. The rinsing apparatus of claim 7 wherein quick-disconnect connector means are provided to connect said conduits with said flexible storage vessels, said water source, said pump means, said switching valve, said jet spray gun means, and said rinsing spray head means.

9. Spray rinsing apparatus adapted for connection with a mobile chemical spray apparatus including a vehicle, an elongated, enclosed chemical tank, and a chemical spray array, comprising in combination:
    (a) at least one generally rectangular and flexible rinse water storage vessel made of a flexible, coated, watertight fabric and adapted to be supported in draped position across an upper side and along a vertical side of said chemical tank;
    (b) first fluid passageway formed near the top of said flexible vessel;
    (c) a second fluid passageway formed near the bottom of said vessel for releasing a liquid through an outlet conduit;
    (d) a pump means mounted on said vehicle with a pump inlet connected to said outlet conduit and a pump outlet connected into the inlet of a high pressure switching valve means;
    (e) spray head means mounted into the top of said reservoir tank for spray rinsing the interior of said reservoir tank;
    (f) said spray head means being connected through a spray head conduit into a first outlet of said high pressure switching valve means; and
    (g) a manually held and operated high pressure spray gun means having a manually variable spray pattern adjustment and connected through a spray gun conduit into a second outlet of said high pressure switching valve means.

10. The apparatus of claim 9 where the coating of said fabric is a flexible polymer.

11. The rinsing apparatus of claim 10 wherein said flexible polymer is a plastic material.

12. The apparatus of claim 9 wherein said first and said second fluid passageways are formed through the wall of said flexible storage vessel with a reinforced compression type conduit fitting.

13. The rinsing apparatus of claim 12 wherein quick-disconnect connector means are provided to connect said conduits with said flexible storage vessels, said water source, said pump means, said switching valve, said jet spray gun means, and said rinsing spray head means.

14. The apparatus of claim 9 wherein said pump means is a positive displacement pump driven by an internal combustion engine.

15. Spray rinsing apparatus in connection with a mobile chemical spray apparatus including a vehicle, an elongated, enclosed chemical tank, and a chemical spray array, comprising in combination:
    (a) a pair of rectangular, flexible rinse water storage vessels each made of a flexible, coated fabric and adapted to be supported in draped position across the upper sides and along each side of said chemical tank;
    (b) first fluid inlet passageways formed near the tops of said flexible vessels;
    (c) second fluid outlet passageways formed near the bottoms of said vessels for releasing liquid through outlet conduits;
    (d) a pump means mounted on said vehicle with a pump inlet connected to said outlet conduits and a pump outlet connected into the inlet of a high pressure switching valve means;
    (e) a single spray head means mounted into the top of said reservoir tank for spray rinsing the complete interior of said reservoir tank;
    (f) said spray head means being connected through a spray head conduit into a first outlet of said high pressure switching valve means;
    (g) a manually held and operated high pressure spray gun means having a manually variable spray pattern adjustment and connected through a spray gun conduit into a second outlet of said high pressure switching valve means;

(h) said flexible storage vessels being connected together through a liquid equalizer conduit connected into said outlet passageways of each said storage vessel;

(i) wherein said fluid passageways are respectively formed through a wall of said flexible storage vessels with a reinforced compression type fitting means;

(j) wherein said pump means is a positive displacement pump driven by an internal combustion engine;

(k) wherein quick-disconnect connector means are provided to connect said conduits with said flexible storage vessels, said water source, said pump means, said switching valve, said jet spray gun means, and said rinsing spray head means; and (l) wherein the coating of said fabric is a plastic material.

* * * * *